United States Patent
Vendrow

(10) Patent No.: US 12,261,894 B2
(45) Date of Patent: *Mar. 25, 2025

(54) SYSTEM AND METHOD OF INTELLIGENTLY SHARING CONFERENCE CONTENT

(71) Applicant: RingCentral, Inc., Belmont, CA (US)

(72) Inventor: Vlad Vendrow, Reno, NV (US)

(73) Assignee: RingCentral, Inc., Belmont, CA (US)

( * ) Notice: Subject to any disclaimer, the term of this patent is extended or adjusted under 35 U.S.C. 154(b) by 193 days.

This patent is subject to a terminal disclaimer.

(21) Appl. No.: 18/075,915

(22) Filed: Dec. 6, 2022

(65) Prior Publication Data

US 2023/0110945 A1    Apr. 13, 2023

Related U.S. Application Data

(63) Continuation of application No. 16/948,781, filed on Sep. 30, 2020, now Pat. No. 11,553,012.

(51) Int. Cl.
| | |
|---|---|
| *H04L 65/403* | (2022.01) |
| *G06N 20/00* | (2019.01) |
| *H04L 65/1069* | (2022.01) |
| *H04L 65/1089* | (2022.01) |
| *H04L 65/401* | (2022.01) |

(52) U.S. Cl.
CPC ......... *H04L 65/1089* (2013.01); *G06N 20/00* (2019.01); *H04L 65/1069* (2013.01); *H04L 65/4015* (2013.01); *H04L 65/403* (2013.01)

(58) Field of Classification Search
CPC ............ H04L 65/1089; H04L 65/1069; H04L 65/4015; H04L 65/403; G06N 20/00; G06N 3/08; G06F 3/04842; G06F 40/30
See application file for complete search history.

(56) References Cited

U.S. PATENT DOCUMENTS

| | | | |
|---|---|---|---|
| 9,456,024 B1* | 9/2016 | Charters | G06F 16/951 |
| 9,716,861 B1* | 7/2017 | Poel | H04M 7/0027 |
| 10,354,256 B1* | 7/2019 | McInerny | G06T 13/40 |
| 10,638,090 B1* | 4/2020 | Sculley | H04L 65/403 |
| 10,778,728 B2* | 9/2020 | Verthein | H04M 3/51 |
| 2005/0267945 A1* | 12/2005 | Cohen | G06F 21/10 |
| | | | 709/215 |
| 2006/0271624 A1* | 11/2006 | Lyle | H04L 12/1822 |
| | | | 709/204 |
| 2011/0109716 A1* | 5/2011 | Choi | H04N 7/15 |
| | | | 348/14.08 |
| 2011/0179115 A1* | 7/2011 | Castro | G06F 16/9535 |
| | | | 709/204 |
| 2011/0268262 A1* | 11/2011 | Jones | H04M 3/42008 |
| | | | 379/202.01 |
| 2012/0089927 A1* | 4/2012 | Salmen | G07G 1/0009 |
| | | | 715/753 |
| 2012/0133727 A1* | 5/2012 | Bolduc | H04N 7/152 |
| | | | 348/E7.083 |

(Continued)

*Primary Examiner* — Syed Ali

(57) ABSTRACT

A computer-implemented method for sharing conference content is provided. The method comprises receiving a share input from a first device corresponding to a participant of a conference session, determining content for sharing using communication information associated with the participant, determining that the content is available through a second device and sharing the content using the second device.

15 Claims, 9 Drawing Sheets

(56) References Cited

U.S. PATENT DOCUMENTS

| | | | | |
|---|---|---|---|---|
| 2012/0166997 A1* | 6/2012 | Cho | G06F 21/6218 | 715/778 |
| 2012/0244836 A1* | 9/2012 | Colbert | H04L 12/1822 | 455/411 |
| 2012/0266077 A1* | 10/2012 | O'Keefe | G09F 27/00 | 715/739 |
| 2012/0274728 A1* | 11/2012 | Yasoshima | H04N 7/15 | 348/E7.083 |
| 2013/0088605 A1* | 4/2013 | Quarfordt | H04W 4/80 | 348/207.1 |
| 2013/0194376 A1* | 8/2013 | Tseng | H04N 7/15 | 348/14.08 |
| 2013/0212490 A1* | 8/2013 | Scherpa | G06Q 10/101 | 715/753 |
| 2014/0025847 A1* | 1/2014 | Choi | G06F 13/102 | 710/33 |
| 2014/0198174 A1* | 7/2014 | Sanso | H04N 7/15 | 704/235 |
| 2014/0240440 A1* | 8/2014 | Seo | H04L 51/04 | 715/753 |
| 2014/0313282 A1* | 10/2014 | Ma | H04N 7/141 | 348/14.09 |
| 2014/0325393 A1* | 10/2014 | Quinn | G06F 3/04842 | 715/753 |
| 2015/0002369 A1* | 1/2015 | Araki | G06F 3/1438 | 345/1.1 |
| 2015/0002548 A1* | 1/2015 | Tsutsumitake | G09G 5/14 | 345/635 |
| 2015/0007066 A1* | 1/2015 | Joo | G06F 3/1423 | 715/761 |
| 2015/0139609 A1* | 5/2015 | Pattan | G11B 27/10 | 386/241 |
| 2015/0163561 A1* | 6/2015 | Grevers, Jr. | H04N 21/42203 | 704/235 |
| 2015/0350690 A1* | 12/2015 | Zerr | H04N 21/64707 | 725/82 |
| 2016/0065625 A1* | 3/2016 | Ouyang | H04L 65/4038 | 715/753 |
| 2016/0078903 A1* | 3/2016 | Chitnis | H04N 5/765 | 386/219 |
| 2016/0094593 A1* | 3/2016 | Priya | H04L 65/403 | 709/204 |
| 2017/0223066 A1* | 8/2017 | Grevers, Jr. | H04L 65/1083 | |
| 2017/0339249 A1* | 11/2017 | Forster | H04L 67/63 | |
| 2019/0037171 A1* | 1/2019 | Nagpal | H04N 7/147 | |
| 2019/0073490 A1* | 3/2019 | Agrawal | G06F 3/1454 | |
| 2019/0141292 A1* | 5/2019 | Thakkar | H04L 12/1818 | |
| 2019/0163927 A1* | 5/2019 | Kochura | G06F 40/151 | |
| 2019/0166330 A1* | 5/2019 | Ma | H04L 65/403 | |
| 2019/0320301 A1* | 10/2019 | Chang | H04W 4/14 | |
| 2019/0339822 A1* | 11/2019 | Devine | G06V 40/16 | |
| 2020/0184217 A1* | 6/2020 | Faulkner | G06T 7/50 | |
| 2020/0202634 A1* | 6/2020 | Faulkner | G06F 21/604 | |
| 2020/0249902 A1* | 8/2020 | Taguchi | H04L 67/025 | |
| 2020/0293975 A1* | 9/2020 | Faulkner | G06Q 10/063114 | |
| 2020/0336794 A1* | 10/2020 | Fels | H04N 21/440236 | |
| 2021/0185276 A1* | 6/2021 | Peters | G06V 20/41 | |
| 2022/0078139 A1* | 3/2022 | Sreenivasan | G16H 80/00 | |

* cited by examiner

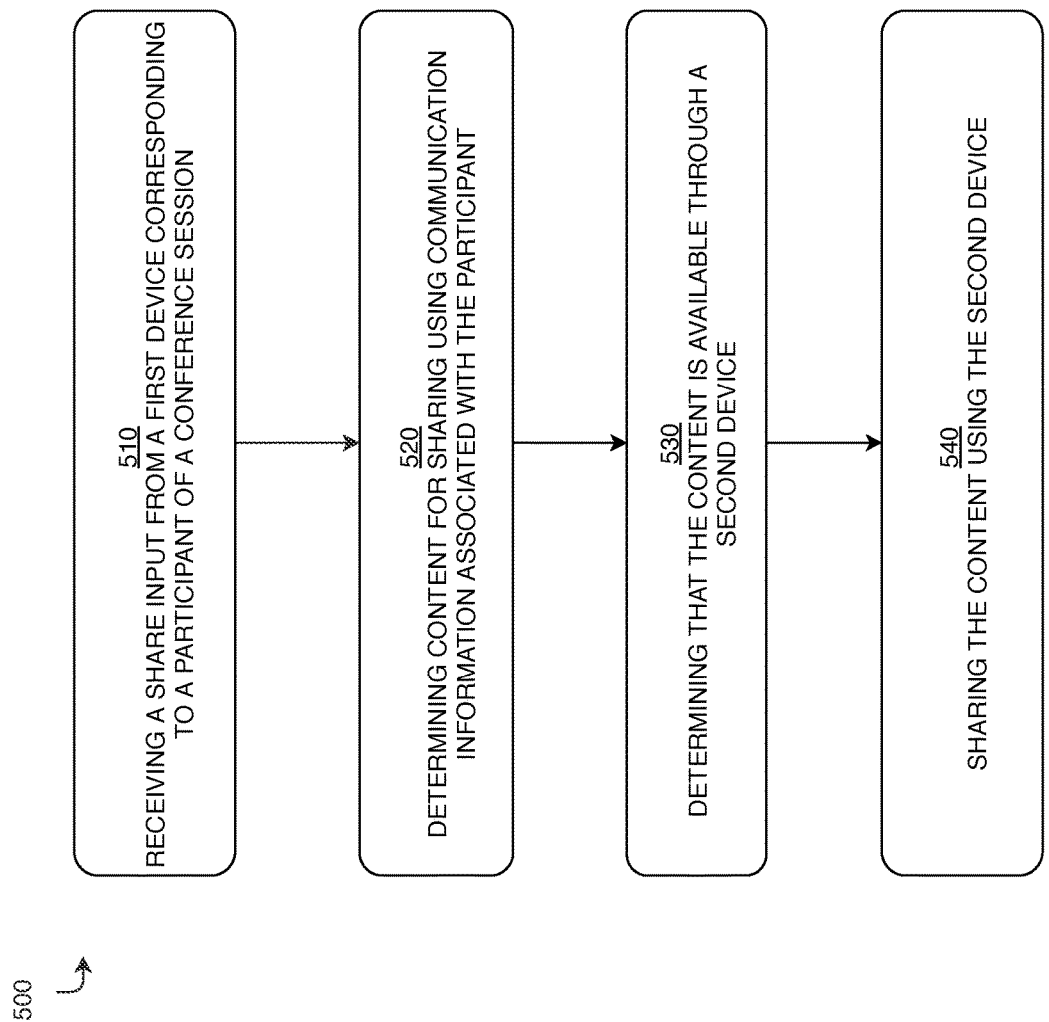

SYSTEM AND METHOD OF INTELLIGENTLY SHARING CONFERENCE CONTENT

RELATED APPLICATION

The instant application is a Continuation Application that claims the benefit and priority to the U.S. Nonprovisional application Ser. No. 16/948,781 that was filed on Sep. 30, 2020, which is incorporated herein by reference in its entirety.

TECHNICAL FIELD

The present disclosure relates generally to the field of conferencing systems. Specifically, the present disclosure relates to systems and methods of intelligently sharing conference content.

BACKGROUND

Online and virtual conferences have become a prominent feature in conducting business in light of the multi-locational aspect of most businesses. The use and importance of online and virtual conferences have been heightened due to shelter-in-place restrictions that were instituted in response to the COVID-19 pandemic, along with a concomitant trend towards companies allowing more remote working and the resulting migration of many employees to more remote suburbs, or even different cities, states, or countries.

While it is commonplace for users of online conferences to share content that is stored locally on their own user devices, problems arise if multiple users have different versions stored in different locations. The present disclosure solves the above limitations of a present technology.

SUMMARY

The appended claims may serve as a summary of the invention.

BRIEF DESCRIPTION OF THE DRAWINGS

FIG. 5 is a flowchart that shows a method of intelligently sharing conference content, in an example embodiment.

DETAILED DESCRIPTION

Figure 1:
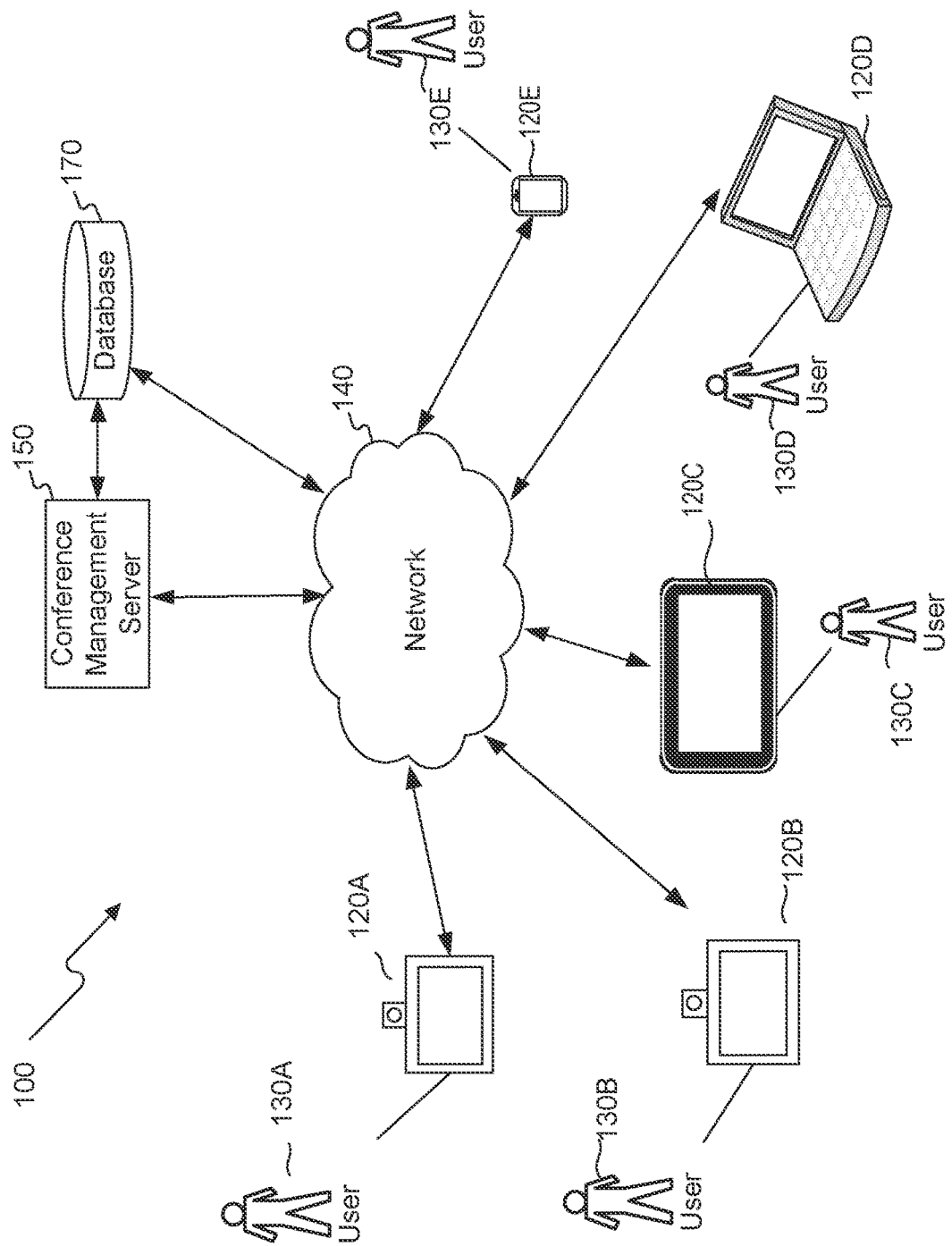
FIG. 1 depicts a conference management system, in an example embodiment.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things (IoT) devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

It should be understood, that terms "user" and "participant" have equal meaning in the following description.

Embodiments are described in sections according to the following outline:

1.0 GENERAL OVERVIEW
2.0 STRUCTURAL OVERVIEW
3.0 FUNCTIONAL OVERVIEW
4.0 PROCEDURAL OVERVIEW 1.0 General Overview The present disclosure generally relates to intelligently sharing conference content. The terms "conference" or "conferencing" refers to a meeting in, for example, audio and/or video formats between users, herein referred to as participants or attendees. The term "attendee" refers to a participant who is not presenting at a conference. The term "presenter" refers to a participant who is presenting at a conference. The term "content" refers to content shared between participants during a presentation, such as computer screens, computer applications, presentation slides, documents, images, hyperlinks, audio, video, text, or any other content shared between participants.

Generally, a conferencing system allows participants to communicate and share various types of content. For example, audio content may be shared in the form of synchronous and/or asynchronous voice data. Synchronous voice data may include multi-directional live audio exchanges, such as Voice over Internet Protocol (VoIP) exchanges, or exchanges using other varieties of telephony. In another example, video content may also be shared in the form of video data exchanged during a video conference, streaming video broadcast between participants, and so forth.

In some embodiments, a conferencing system may be application-based or web-based. A web-based conferencing platform, for example, allows participants to share, in real-time, their computer screens, computer applications, or web-based content among the computers and mobile devices of the participants using a web browser, a web portal, or any other Internet-based platform. The web conferencing platform may be an internet-based software as a service (SaaS) system, in some embodiments. As another example, a multimedia conferencing system may include participants attending a lecture or a meeting at a location and interacting with each other in person and through mobile devices. For example, participants may attend a lecture and interact with each other through mobile devices while listening to a lecture.

The present disclosure relates to a method for sharing conference content. The method comprises receiving a share input from a first device corresponding to a participant of a conference session, determining content for sharing using communication information associated with the participant, determining that the content is available through a second device, and sharing the content using the second device.

In some embodiments, a computer-readable medium storing a set of instructions that, when executed by a processor cause receiving a share input from a first device corresponding to a participant of a conference session. The instructions also cause determining content for sharing using communication information associated with the participant, determining that the content is available through a second device, and sharing the content using the second device.

In some embodiments, instructions stored in a memory and executed by a processor of a system cause receiving a share input from a first device corresponding to a participant of a conference session, determining content for sharing using communication information associated with the participant, determining that the content is available through a second device, and sharing the content using the second.

The current disclosure provides a technological solution to the technological problem of inaccessibility to content for sharing that may arise due to different participants having different or older versions of sharable content or not having access to the sharable content all together. The technological solution involves automatically determining content for sharing, determining a source for where that content for sharing can be retrieved, and automatically sharing that content among participants based on communications of the participants of the conference.

2.0 Structural Overview

FIG. 1 shows an example conference management system 100 in which various implementations as described herein may be practiced. Conference management system 100 enables a plurality of users to engage in conference meetings and share content during those conferences. In some examples, one or more components of conference management system 100, such as conference management server 150, can be used to implement computer programs, applications, methods, processes, or other software to perform the described techniques and to realize the structures described herein.

As shown in FIG. 1, conference management system 100 includes one or more user devices 120A-120E (collectively, referred to as user devices 120), a network 140, a conference management server 150, and a database 170. The components and arrangements shown in FIG. 1 are not intended to limit the disclosed embodiments, as the system components used to implement the disclosed processes and features can vary.

The network 140 facilitates communications and sharing of conference scheduling content between user devices 120 (some or all) and the conference management server 150. The network 140 may be any type of networks that provides communications, exchanges information, and/or facilitates the exchange of information between the conference management server 150 and user devices 120. For example, network 140 broadly represents a one or more local area networks (LANs), wide area networks (WANs), metropolitan area networks (MANs), global interconnected internetworks, such as the public internet, public switched telephone networks ("PSTN"), or other suitable connection(s) or combination thereof that enables conference management system 100 to send and receive information between the components of conference management system 100. Each such network 140 uses or executes stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein are configured to connect to the network 140 and the disclosure presumes that all elements of FIG. 1 are communicatively coupled via network 140. A network may support a variety of electronic messaging formats, and may further support a variety of services and applications for user devices 120.

The conference management server 150 can be a computer-based system including computer system components, desktop computers, workstations, tablets, hand-held computing devices, memory devices, and/or internal network(s) connecting the components. The conference management server 150 may be configured to provide conference services to users 130A-130E. The conference management server 150 may be configured to receive information from user devices 120 over the network 140, process the information, store the information to a database 170, and/or transmit notifications to the user devices 120 over the network 140. For example, the conference management server 150 may be configured to analyze physical inputs, video signals, and audio signals sent by users 130A-130E and enable intelligent sharing of various content between to the users 130A-130E. The conference management server 150 is configured to communicate with user devices 120A-120E in order to determine, select, and share content during a conference session.

In some implementations, the functionality of the conference management server 150 described in the present disclosure is distributed among one or more of the user devices 120A-120E. For example, one or more of the user devices 120A-120E may perform functions such as automatically detecting content to share, determining an availability of the content, accessing and controlling the content locally or remotely, and causing the content to display in a display screen of a user device 120A-120E.

The database 170 includes one or more physical or virtual storages coupled with or accessible by the conference management server 150 and/or the user devices 120A-120E. The database 170 is configured to store content for sharing, communication information or communication data of at least one participant of the conference session, training datasets and/or machine learning algorithm(s) for automatically determining content to share, and any other relevant data. In some embodiments, the database 170 is stored in a cloud-based server (not shown) that is accessible by the conference management server 150 and/or the user devices 120A-120E through the network 140. While the database 170 is illustrated as an external device connected to the conference management server 150, the database 170 may also reside within the conference management server 150 as an internal component of the conference management server 150.

As shown in FIG. 1, users 130A-130E may communicate with conference management server 150 using various types of user devices 120A-120E via network 140. As an example, user devices 120A, 120B, and 120D include a display such as a television, tablet, computer monitor, video conferencing console, or laptop computer screen. User devices 120A, 120B, and 120D may also include video/audio input devices such as a video camera, web camera, or the like. As another example, user devices 120C and 120E include mobile devices such as a tablet or a smartphone having display and video/audio capture capabilities. User devices 120A-120E may also include one or more software applications that facilitate the user devices to engage in communications, such as IM, text messages, E-mail, VoIP, video conferences, or any other communications with one another.

3.0 Functional Overview

Figure 2:
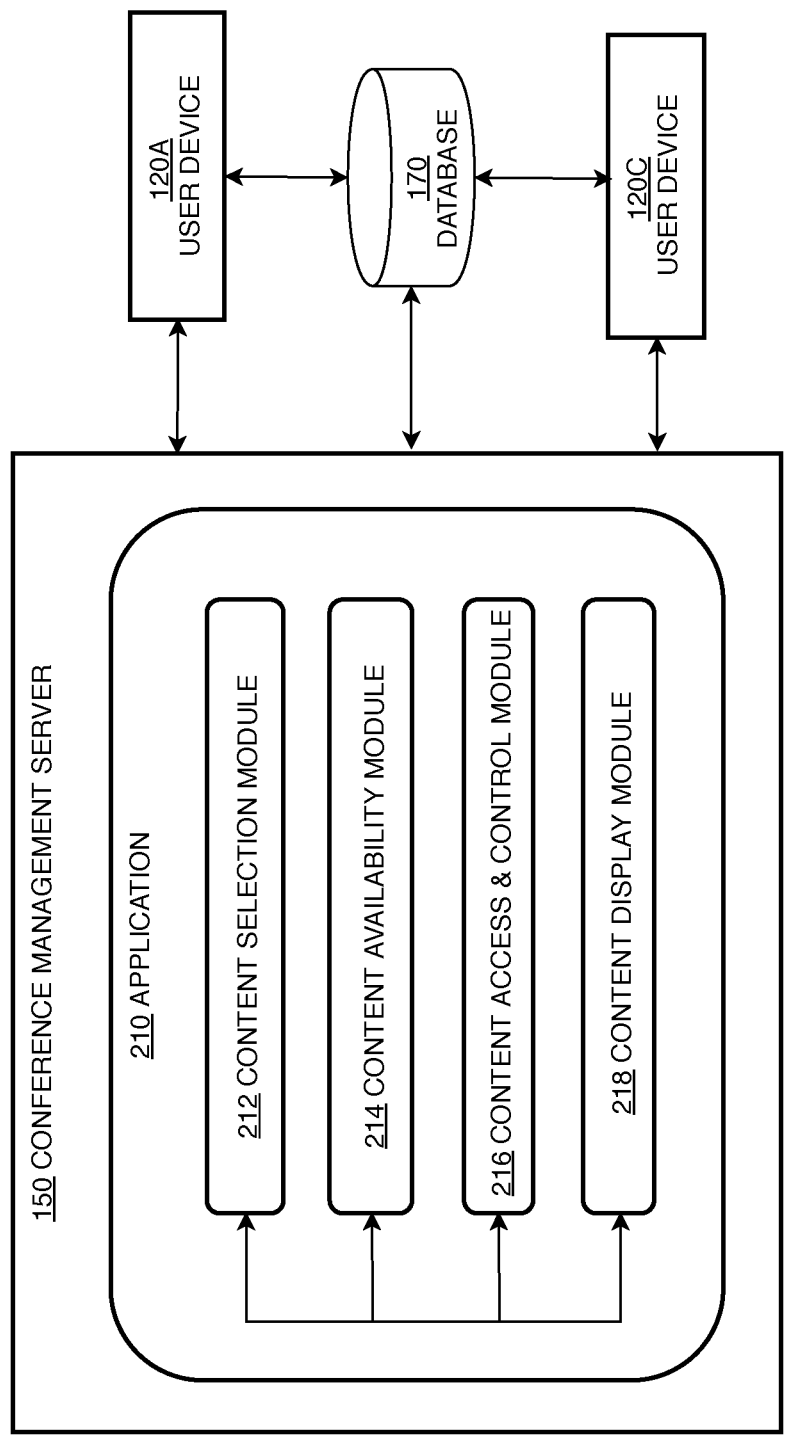
FIG. 2 depicts a content sharing system, in an example embodiment.

FIG. 2 depicts a content sharing system, in an example embodiment. In the example of FIG. 2, an application 210 runs on the conference management server 150. The application 210 is an application that automatically determines likely content for sharing and the availability of that content across various devices. The application 210 also evaluates access control to the content, and subsequent causes the displaying of the shared content. For example, application 210 may allow a user at user device 120A to access a third party's file that is stored elsewhere, such as in database 170 or on user device 120C, and share that file with other users during a conference session. In some embodiments, the content is also available for sharing after the conference session has ended.

In one embodiment, the application 210 is configured with one or more modules or set of instructions for content selection and sharing. In the example of FIG. 2, the application 210 is configured with a content selection module 212, a content availability module 214, a content access & control module 216, and a content display module 218, as further described herein. While the example of FIG. 2 depicts four modules, any number of modules across any number of devices may be used. In some embodiments, fewer modules are used while in other embodiments, additional modules are used.

In an embodiment, the content selection module 212 selects content for sharing. In some embodiments, the content selection modules 212 automatically evaluates participant communications and determines content for sharing. Content for sharing may be content that is likely to be shared based on communications related to the content. For example, if a participant has a chat history indicating that a document entitled "Business Plan" needs to be finalized in time for the current conference session meeting, then the "Business Plan" document may be determined to be a document that is likely to be shared during the conference session. As another example, if two participants had a previous phone conversation to discuss an upcoming quarterly meeting where financial results should be shared, the content selection module 212 will identify a "Quarterly Results" presentation file as the content that is likely to be shared during the conference session, even if the "Quarterly Results" presentation will be presented by a third participant who did not participate in the phone conversation. In some embodiments, the content selection module 212 will identify a most recently updated version of the content for sharing from among the various participants. In some embodiments, the content that is likely to be shared during the conference session may also be shared after the conference session (e.g. during a different conference session or a subsequent follow-up conference session).

The content selection module 212 will evaluate various types of communications of all attendees and/or participants of the conference session made prior to or during the conference session to determine the content for sharing. Different types of communication may include, for example, text data, audio data, or any other type of data.

Text data of participants communications may be stored in the database 170 or on user devices 120A-120C. The text data may be analyzed by the management server 150 using existing natural language processing (NLP) and machine learning (ML) techniques to determine content for sharing.

Audio data of participants communications may also be stored in the database 170 as an audio file. In some embodiments, the audio data is transcribed and stored as text data. The transcription may be produced and that subsequently analyzed by the management server 150 using existing NLP and ML techniques.

Figure 3:
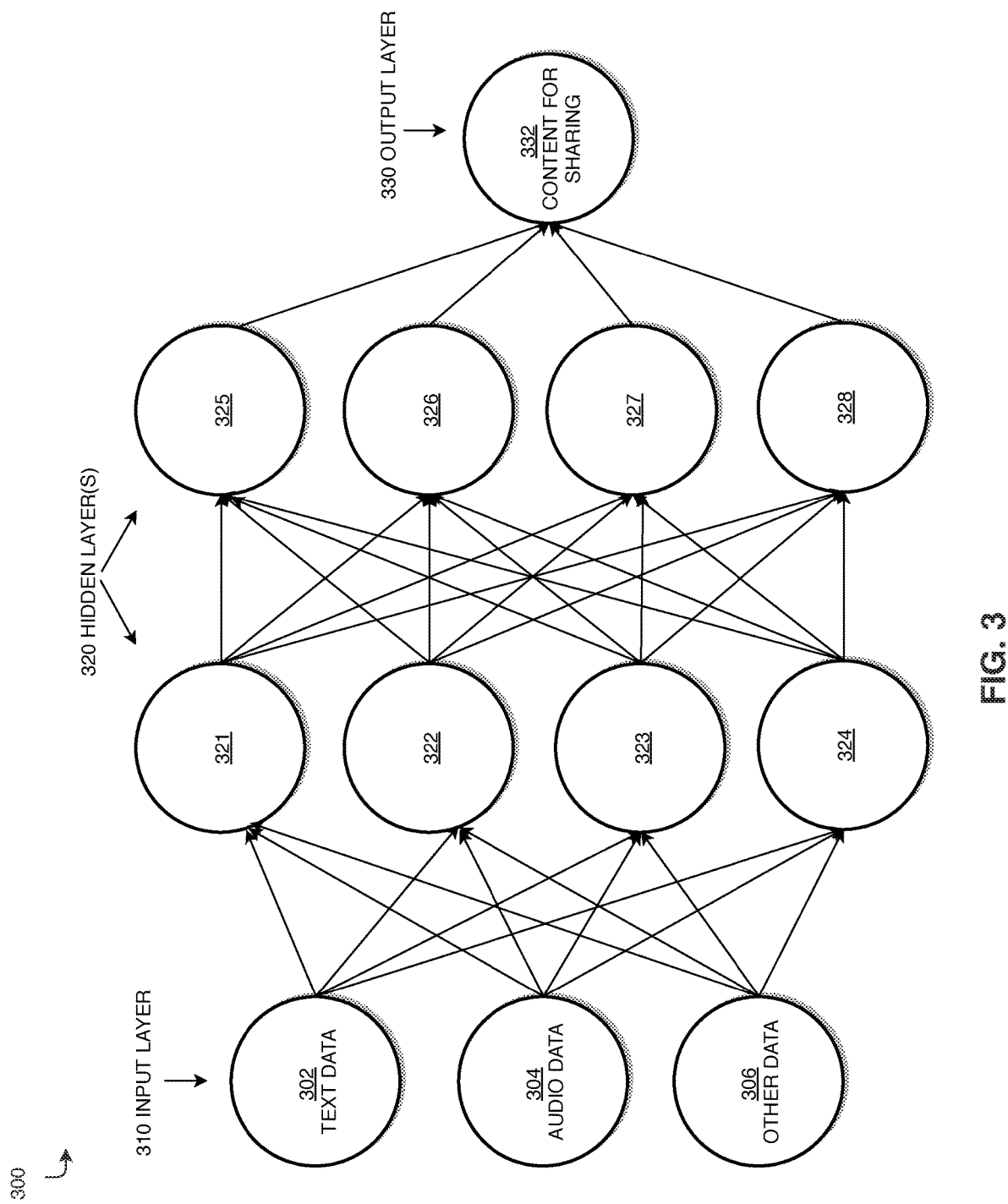
FIG. 3 depicts a neural network, in an example embodiment.

In an embodiment, machine learning may be used to train the content selection module 212 to automatically select the likely content for sharing during a conference session. Referring to FIG. 3, a neural network 300 may utilize an input layer 310, one or more hidden layers 320, and an output layer 330 to train a machine learning algorithm or model to detect content for sharing 332. Data for the input layer 310 may include text data, audio data, as well as other data, such as data pertaining to the recency of access to certain files, applications, or communications (e.g. file sent via email or chat right before the start of the conference session), keywords in text or audio format, data about recently updated files by participants of the conference session, and so forth, as further described herein. The output layer 330 includes the determined content for sharing 332. In some embodiments, where contents for sharing are labeled, supervised learning is used such that known input data, a weighted matrix, and know output data is used to gradually adjust the model to accurately compute the already known output. In other embodiments, where contents for sharing are not labeled, unstructured learning is used such that a model attempts to reconstruct known input data over time in order to learn.

Training of the neural network 300 using one or more training input matrices, a weight matrix and one or more known outputs is initiated by one or more computers associated with the content selection module 212. For example, the content selection module 212 may be trained by one or more training computers and, once trained, used in association with the conference management server 150 and/or user device 120A-120E to determine which content will likely be shared and subsequently enable a user 130A-130E to share the content. In an embodiment, a computing device may run known input data through a deep neural network 300 in an attempt to compute a particular known output. For example, a server computing device uses a first training input matrix and a default weight matrix to compute an output. If the output of the deep neural network does not match the corresponding known output of the first training input matrix, the server adjusts the weight matrix, such as by using stochastic gradient descent, to slowly adjust the weight matrix over time. The server computing device then re-computes another output from the deep neural network with the input training matrix and the adjusted weight matrix. This process continues until the computer output matches the corresponding known output. The server computing device then repeats this process for each training input dataset until a fully trained model is generated.

In the example of FIG. 3, the input layer 310 includes a plurality of training datasets that are stored as a plurality of training input matrices in an associated database, such as database 170 of FIG. 2. The training input data includes, for example, text data 302, audio data 304 and other data 306. Text data 302 relates to text communications between participants, attendees, and/or non-participants. Text data 302 includes Short Message Service (SMS) or Multimedia Messaging Service (MMS) messages, messaging applications messages, collaboration tool messages, e-mail messages, transcriptions, etc. Audio data 304 is input data related to any audio communications between participants, attendees, and/or third parties who are not part of upcoming conference session. Other data 306 may include input data related to any other information, such as information related to a recency of access to certain communications (e.g. files sent via email or chat before the start of the conference session), keywords in text or audio form, data pertaining to recently updated files by participants of the conference session, etc. While the example of FIG. 3 uses a single neural network for text data 302, audio data 304, and other data 306, in some embodiments, separate neural networks may be used in association with any set of training data. Any number of neural networks may be used to train the content selection module 202.

In the embodiment of FIG. 3, hidden layers 320 represent various computational nodes 321, 322, 323, 324, 325, 326, 327, 328. The lines between each node 321, 322, 323, 324, 325, 326, 327, 328 represent weighted relationships based on the weight matrix. As discussed above, the weight of each line is adjusted overtime as the model is trained. While the embodiment of FIG. 3 features two hidden layers 320, the number of hidden layers is not intended to be limiting. For example, one hidden layer, three hidden layers, ten hidden layers, or any other number of hidden layers may be used for a standard or deep neural network. The example of FIG. 3 also features an output layer 330 with content for sharing 332 as the known output. The content for sharing 332 indicates content that will likely be shared. For example, the content for sharing 332 may be files, such as documents, slideshows, audio files, video files, etc., as well as hyperlinks, display screens of user devices, particular application(s) running on user devices, or any other content. As discussed above, in this structured model, the content for sharing 332 is used as a target output for continuously adjusting the weighted relationships of the model. When the model successfully outputs the content for sharing 332, then the model has been trained and may be used to process live or field data.

Once the neural network 300 of FIG. 3 is trained, the trained content selection module 212 will accept field data at the input layer 310, such as recent or current communication information. In some embodiments, the field data is live data that is accumulated in real time, such as a live streaming video and/or audio of a conference session. In other embodiments, the field data may be current data that has been saved in an associated database, such as database 170. The trained content selection module 212 is applied to the field data in order to identify content for sharing at the output layer 330. For instance, a trained content selection module 212 can identify a slideshow presentation that was discussed in a participant's recent chat exchange as the content to share.

Returning to FIG. 2, the content availability module 214 checks for the availability of the determined content across various devices and storage databases. The content availability module 214 will, for example, check a local computer or other device of a presenter and/or cloud storage servers and databases that the presenter has access to, or other participants' local computers, devices, and/or cloud servers and databases that other participants have access to. In another embodiment, the content availability module 214 can check if the content for sharing is accessible on shared folders and other publicly or partially publicly (for example, a public portal inside an organization) available resources. For example, if the content selection module 212 determined that the "Business plan" document will likely be shared during a conference session, the content availability module 214 checks if this document is present on the presenter's local computer or stored in cloud platforms that the presenter has logged into, has an account with, or otherwise has access to. In another embodiment, the content availability module 214 checks if the document is present on any other device associated with other participants and/or third parties.

The conference management server 150 can store the results of the check performed by the content availability module 214 in the database 170. The check results can be stored as a link to the content for sharing or as a database copy of the content for sharing, with all related information such as the date of creation, date of last modification, date of last opening, etc. In some embodiments, rather than linking to the content, a copy of the content is stored locally on the conference management server 150 or locally on a user device such as User device 120A, 120C. Thereafter, the content may be shared from the server or the user device. In the example above, the content availability module 214 determines that the "Business plan" document is stored in multiple locations: on a local computer of the presenter (for example, User device 120C), in a cloud storage where the presenter was logged on and on an attendee's local computer (for example, User device 120A). This information is subsequently stored by the conference management server 150 in the database 170 as links to these "Business plan" files. In some embodiments, check results and/or associated information is stored in the database 170 or locally on a user device for retrieval after the conference session has ended. For example, a link to the content for sharing, along with all associated information, may be stored in database 170 for subsequent retrieval thereafter, such as during a later conference session or for later local access from a user device.

The content access and control module 216 determines if the content for sharing can be retrieved and shared from storage. In some embodiments, the content access and control module 216 evaluates security and access controls associated with the content and determines whether the content is sharable. Some content, such as privileged and/or confidential documents, may have associated access controls that prevent the conference management server 150 from accessing the files for sharing. For example, if the content selection module 212 determines that a "Business plan" document will likely be shared, and the content availability module 214 determines that it is stored in three locations, the content access and control module 216 then checks for the accessibility of the document in all three locations. If the "Business plan" document that is stored on a third-party participant's local device has permissive security settings that allow for sharing, then then that particular version of the "Business plan" from the third party's device can be shared. If the "Business plan" document that is stored locally on the presenter's device and in the presenter's cloud storage has restrictive security settings that deny sharing, then those versions of the "Business plan" may contain confidential information and will not be shared.

In some embodiments, the content access and control module 216 requests access to restricted content to obtain the security rights to share the content. For example, the content access and control module 216 may enable a presenter to request access to a restricted document, which the owner of that restricted document can grant or deny. In some embodiments, the content access and control module 216 may enable a presenter to directly alter the security settings from restrictive to permissive. For example, the content access and control module 216 may determine that the presenter is a high-ranking executive based on the presenter's job title and subsequently grant the presenter overriding credentials that enable the high-ranking executive to access the otherwise restricted documents. In some embodiments, overriding credentials for access to restricted documents is provided automatically based on the presenter's job title or position, role in an organization, involvement in creating the shared content, or any other factor.

In some embodiments where several similar documents are determined to be available for sharing by the content availability module 214, the content access and control module 216 determines which of these documents is the most recent. In some embodiments, recency may be a recency of change, recency of access (e.g. opened), or recency of creation. In the example from above, the content access and control module 216 checks if the conference management server 150 can access each of these files and checks additional information related to these files, such as the date of creation, date of last change, and date of last opening. Based on the performed check, the content access and control module 216 determines that the "Business plan" document stored on the presenter's computer (e.g. User device 120C) is inaccessible and has a creation date, last modified date, and last opened date of one week prior to the conference session. The content access and control module 216 also determines that the "Business plan" document stored on the cloud storage is inaccessible, has restrictions on execution, and has a creation date of one week prior to the conference session, a last modified date of 3 days prior to the conference session, and a last opened date of one day prior to the conference session. The content access and control module 216 also determines that the "Business plan"

document stored on an attendee's local computer (e.g. User device 120A) is accessible, has a creation date of one week prior to the conference session, a last modified date and last opening date of 3 days before the conference session. Based on this information the access and control module 216 determines that most updated version of the "Business plan" document that is accessible is the version stored on the attendee's local computer and marks the associated record in the database 170, for example with a designation of "to share."

The content display module 218 causes to display the content that is to be shared during the conference session. In some embodiments, the content may be shared after or external to the current conference session. For instance, the content may be shared during a different conference session or made available locally through a user device. The content display module 218 obtains a link stored in the database 170 that has been designated "to share," retrieves the content for sharing, and sends it to be displayed through User devices 120A-120C. In some embodiments, the content is shared through a web browser running on User devices 120A-120C. For example, the content display module 218 causes the content to be displayed through a browser associated with any of the user devices. In another embodiment, the content display module 218 sends the content for sharing only to selected user devices, for example only to the User device 120A and User device 120C. Selection of which user devices can be done automatically based on participant position, participant level of access to an information inside an organization, participants level of engagement in a discussed topic, etc. Additionally, selection of the user devices to share the content with can be done by the presenter or by a moderator of the conference session.

Figure 4A:
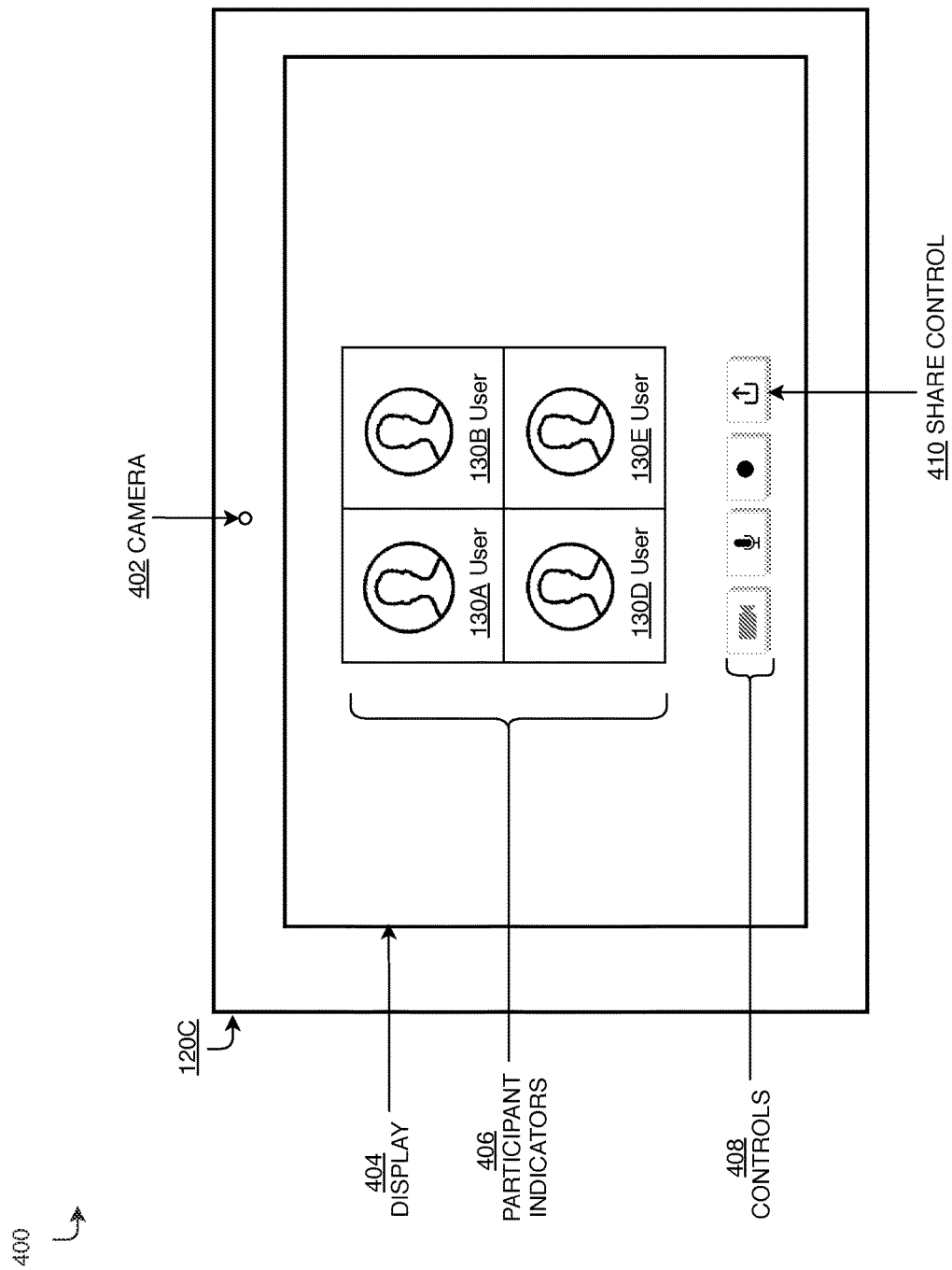
FIG. 4A depicts a display screen and graphical user interface, in an example embodiment.
Figure 4B:
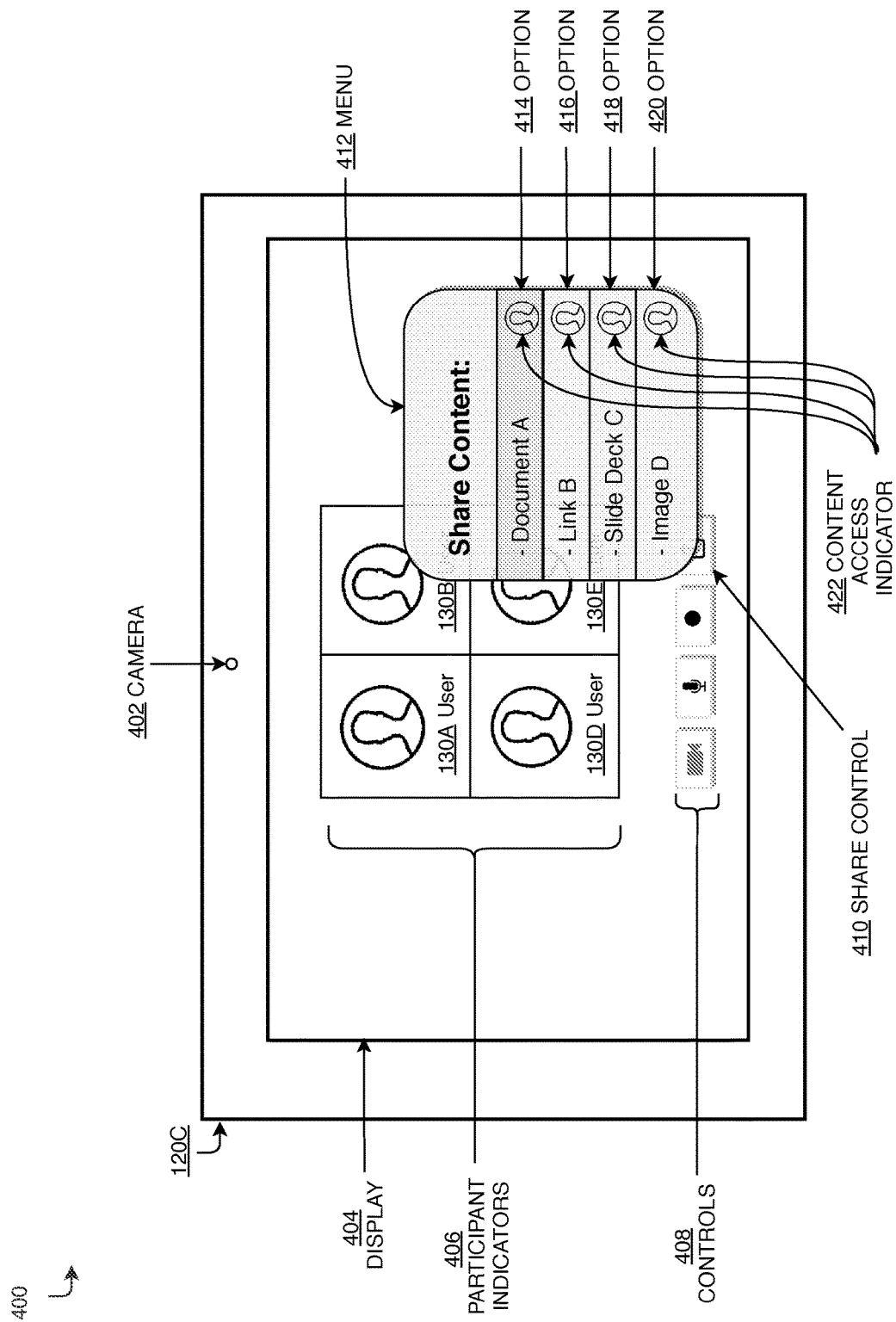
FIG. 4B depicts a display screen and graphical user interface, in an example embodiment.
Figure 4C:
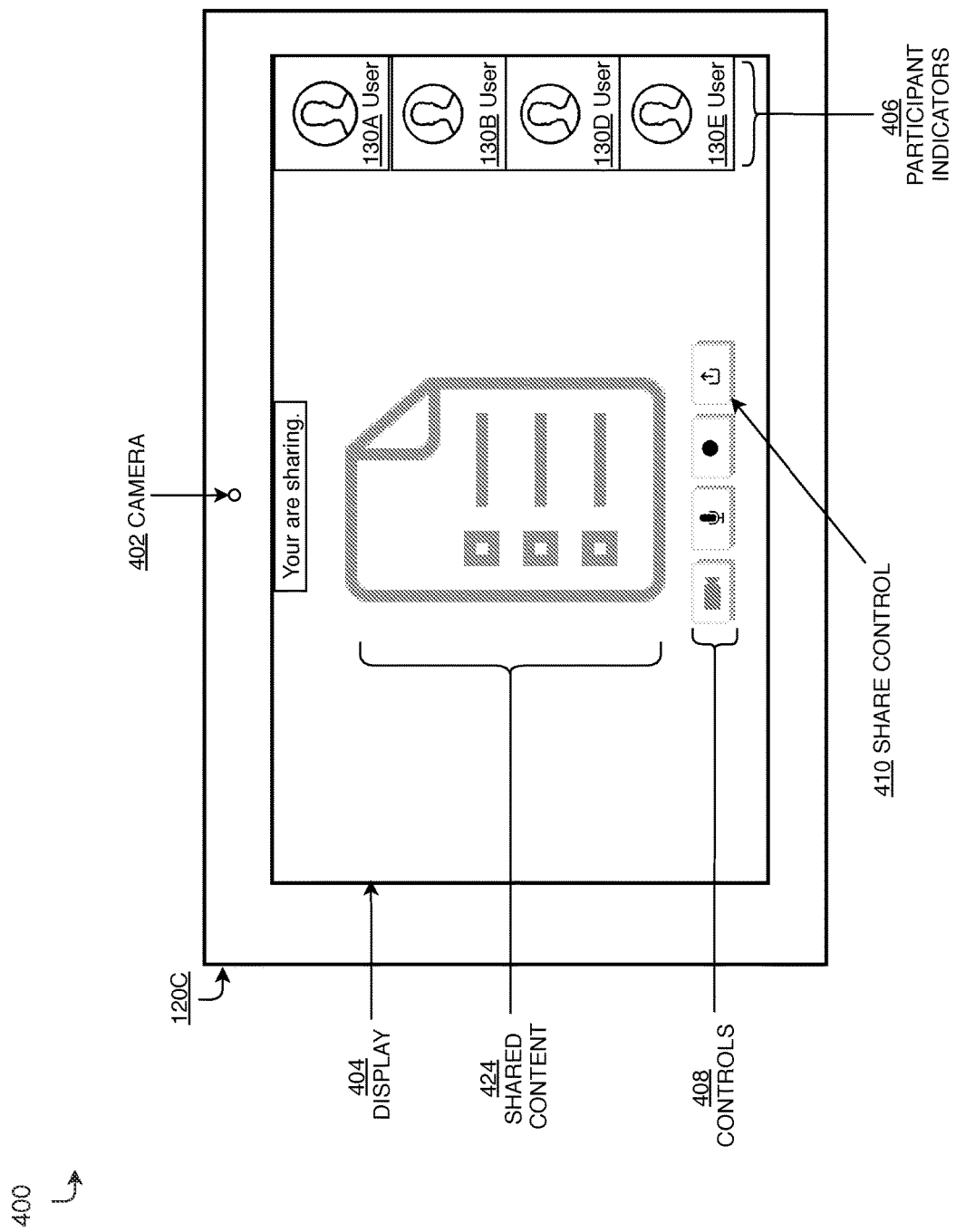
FIG. 4C depicts a display screen and graphical user interface, in an example embodiment.

FIG. 4A, FIG. 4B, and FIG. 4C depict a display screen and graphical user interface, in example embodiments.

FIG. 4A depicts a display screen and graphical user interface 400. The display screen and graphical user interface 400 can be located on a user device 120C, which is associated with User 130A. The User device 120C includes a display 404, where a user interface of a conference session can be displayed, as well as a camera 402 that can capture video feed of a User 130C. The display 404, in this example embodiments, visually presents participant indicators 406 that show the identity of the participants of the conference session, as well as controls 408 that provides the user 130C with ability to switch on/off some functions during the video conference session, such as mute/unmute, turning the camera 402 on/off, and a share control 410 that allows User 130C to share the content that was determined to be shared by the conference management server 150.

FIG. 4B depicts a display screen and graphical user interface 400. The display screen and graphical user interface 400 comprises all elements described in FIG. 4A and additional elements that arrive in response to User 130C selecting the share control 410 function. The selection can be done by clicking on the share control 410 button, by taping on the share control 410 button or by a voice input from the presenter with a command to select the share control 410 button or with a command expressing the desire to start sharing.

After selecting the share control, a menu 412 pops up on the display 404 in some embodiments. The menu 412 comprises options 414, 416, 418, 420 of the content for sharing. In this example embodiment, the option 414 is a Document A, the option 416 is a Link B, the option 418 is a Slide Deck C, the option 420 is an Image D. Referring to the example above, the Document A can be the "Business plan" document that was determined by the conference management server 150 as the likely content for sharing. The Link B, the Slide Deck C, and the Image D may be additional content for sharing with a lower score or rating for the likelihood for selection. For example, these options 416, 418, 420 may have fewer keywords, less communications referencing them, and/or fewer access attempts before the conference session. The order in which the options 414, 416, 418, 420 are sorted and displayed in menu 412 may be based on the likelihood for sharing scores or ratings, such as those described above, an alphabetical order, feedback from the presenter, and/or feedback from participants and attendees. In another embodiment, options 416, 418, 420 list additional content for sharing that was automatically determined using the machine learning techniques further described herein.

In some embodiments, no menu 412 is displayed. Rather, upon receiving the selection of the share control, the conference management server 150 automatically starts sharing the content that has been determined will be shared using machine learning techniques.

FIG. 4C depicts a display screen and graphical user interface 400 when the User 130C chose an option from the menu 412. FIG. 4C has all the same elements that were described for the FIG. 4A, except in response to the User 130C's selection of Option 414, the content for sharing has been shared. The participant indicators 406 are displayed to the right side of the display 404 and a shared content 424 is displayed in the center of the display 404. The shared content 424 can show Document A from the menu 412 (e.g. the "Business plan" document). In some embodiments, other participants who are not the presenter can restrict access to the shared content 424 to other participants in the conference session. For example, User 130A can instruct the conference management server 150 to discontinue displaying the shared content 424 on a User device 120E that is associated with a User 130E. This can be done using a function that is accessible, for example, in share control 410 function. The option to restrict the sharing of the content on other participant devices can be assigned by the presenter or by the moderator of the conference session to some participants. In another example embodiment the option to restrict displaying the shared content on other participant devices can be automatically assigned by the conference management server 150 based on a participant's job title or position, role in an organization, involvement in creating the shared content 424, etc.

4.0 Procedural Overview

FIG. 5 is a flowchart that shows a method of intelligently sharing conference content, in an example embodiment.

At step 510, a share input is received from a first device corresponding to a participant of a conference session. The share input is any input that indicates that a content is to be shared. For example, a participant may select a "Share" control, such as a button of a graphical user interface that is displayed on a display screen of a user device 120A-120E, in order to indicate a desire to share content. In some embodiments, the share input is a voice command or any other indicator of the desire to share content that subsequently triggers a sharing function. In the example of FIG. 1, the first device may be user device 120A-120E or any other general or specific purpose computer. The participant may be the corresponding user 130A-130E associated with his or her respective user device 120A-120E. The conference session is any of video or audio conference session.

At step 520, the content for sharing is determined using user's historical, recent, and/or current communication information which may include text data, audio data, and any other data associated with the user as described in FIG. 3. Content is any form of content, such as files (e.g. document, slideshow, audio file, video file, etc.), hyperlinks, display screens of computing devices, particular application(s) running on computing devices, and so forth.

In some embodiments, after the user's share input is received, the conference management server 150 automatically detects which content is likely to be shared based on the participant's historical, recent, and/or current communication information. The content for sharing is determined using any type of communication information associated with the participant. For example, the communication information may be e-mail messages, meeting invitations, attachments, chat messages, SMS or MMS messages, voicemails, real-time voice and/or video communication, or any other forms of communication information and other information as was described above.

In some embodiments, the conference management server 150 evaluates historical or recent communication information. For instance, the conference management server 150 may retrieve stored communications that a participant was historically or recently involved in from a database 170. The conference management server 150 may initiate transcription, optical character recognition (OCR), natural language processing (NLP), and/or machine learning techniques to identify keywords in these communications. Keywords can be determined by the conference management server 150 based on a topic of the communication session, based on an agenda for the conference session or based on other information related to the conference session. In other embodiments, the conference management server 150 evaluates real-time conference communication for communication information that indicates which content to share. For example, if the conference management server 150 detects real-time discussions between participants of a conference session that describes how user sees development of a company in the ongoing fiscal year, what targets should the company reach and what actions are needed from a team, and the conference management server 150 can determine that there are keywords "fiscal year," "reach targets," "results" using machine learning, and similarly determine that the most relevant document to these keywords is the "Business plan." Consequently, this "Business plan" document may be identified as the content for sharing that should be shared with all participants.

In some embodiments, if a user selects a share button, the conference management server 150 automatically shares the content that the server determines will be shared without any additional input from the user by causing the content to be displayed in a display screen associated with the user or any other users. In some embodiments, the share input from step 510 results in displaying one or more options corresponding to one or more content for sharing in the display screen of the device. For example, the top three most likely files to be shared may be presented as options for user selection in a display screen. In other embodiments, the share input results in the audible announcement of the one or more options corresponding to one or more content for sharing. In some embodiments, the options for the user selection can be displayed only on a display associated with the presenter or the options for the user selection can be displayed on a display associated with the presenter and shared with other participants of the conference session to allow the other participant(s) to offer to share from their devices by choosing one or several options from the options for the user selection. The conference management server 150 tracks all inputs from the participants and stores available options in the database 170.

The content to be shared can be stored locally or remotely relative to the first device. For example, the Document A that was ranked as most likely content for sharing in the menu 412 and placed at the top-most position can be stored locally on the presenters device (e.g. User device 130C) or stored locally on a different device (e.g. User device 130A) that belongs to another participant (e.g. User 120A) whom the presenter worked with on Document A.

In some embodiments, the conference management server 150 makes the determination that the content for sharing is unavailable from the first device (e.g. the User device 130C). In some embodiments, unavailable means completely inaccessible (i.e. —a document is not saved on the first device or otherwise unavailable to the first device). In other embodiments, unavailable means digitally accessible, but not ideally suited for sharing. For example, in some instances, the presenter does not have access to the most updated version of a document for sharing. In other instances, poor network connectivity makes it more efficient to share content from a different device. Therefore, the conference management server 150 may make the determination that the content is otherwise unavailable to share from the first device.

At step 530, the conference management server 150 may subsequently make the determination that the content for sharing is available from a second device. The determination can be done based on a feedback that participants provided in the step 520 or based on search conducted by the conference management server 150 on all available locations including participants devices, cloud storages, and so forth. For example, the User 130A sends feedback to the conference management server by clicking or otherwise choosing the Document A option 414 when the options for the user selection are shared with all participants. The conference management server 150 can access the Document A stored in the User device 120A to check if it available for sharing. In case of any restrictions that prevent the conference management server 150 from sharing the Document A from the User device 120A, it can request that the User 130A allow access to the Document A for the conference management server 150.

At step 540, the content is shared during the conference session using the second device. The conference management server 150 determines the likely content for sharing as described in FIG. 2 and FIG. 3 and at step 520, the likely content for sharing is not available through a first device (e.g. User device 120C) associated with the user who is sharing (such as presenter User 130C) but is available through a second device (e.g. the User device 130A) related to another participant (e.g. the User 130A). The second device may be any device associated with the participants, as well as devices associated with users who did not attend the meeting. The second device may also be a server, such as a local file server, cloud server, or any other server. In some embodiments, the second device is any third-party device that is not associated with any participants of the meeting. In another embodiment, the conference management server 150 can determine that the second device is a storage device that relates to a shared storage inside an organization, a storage that relates to a participant who is not a participant of the conference session, a cloud storage outside the organization, etc.

As described above, in some embodiments, the conference management server 150 stores a link to the likely content for sharing located on the second device as a link in a database 170. The conference management server 150 retrieves the likely content for sharing from the second device based on a command from the presenter sent through the first device. In another embodiment, the conference management server 150 can start sharing automatically based on a topic that the presenter announces or based on a content that participants of a conference session are discussing at the moment.

In some embodiments, the presenter who is sharing the content from the second device can manipulate the likely content for sharing that is located on the second device. For example the presenter can change a selection option of a particular file, change the content of the file, etc.

In another embodiment, the content is shared with a limited number or limited list of participants in the conference session. The limited number or limited list of participants can be determined automatically by the conference management server 150 based on participant job titles or positions inside an organization, involvement in the creation of the likely content for sharing, security restrictions, based on access to confidential information by the participants.

In some embodiment the second device from where the content is shared can be excluded from the limited number or limited list of participants with whom the content is shared during the conference session.

Figure 6:
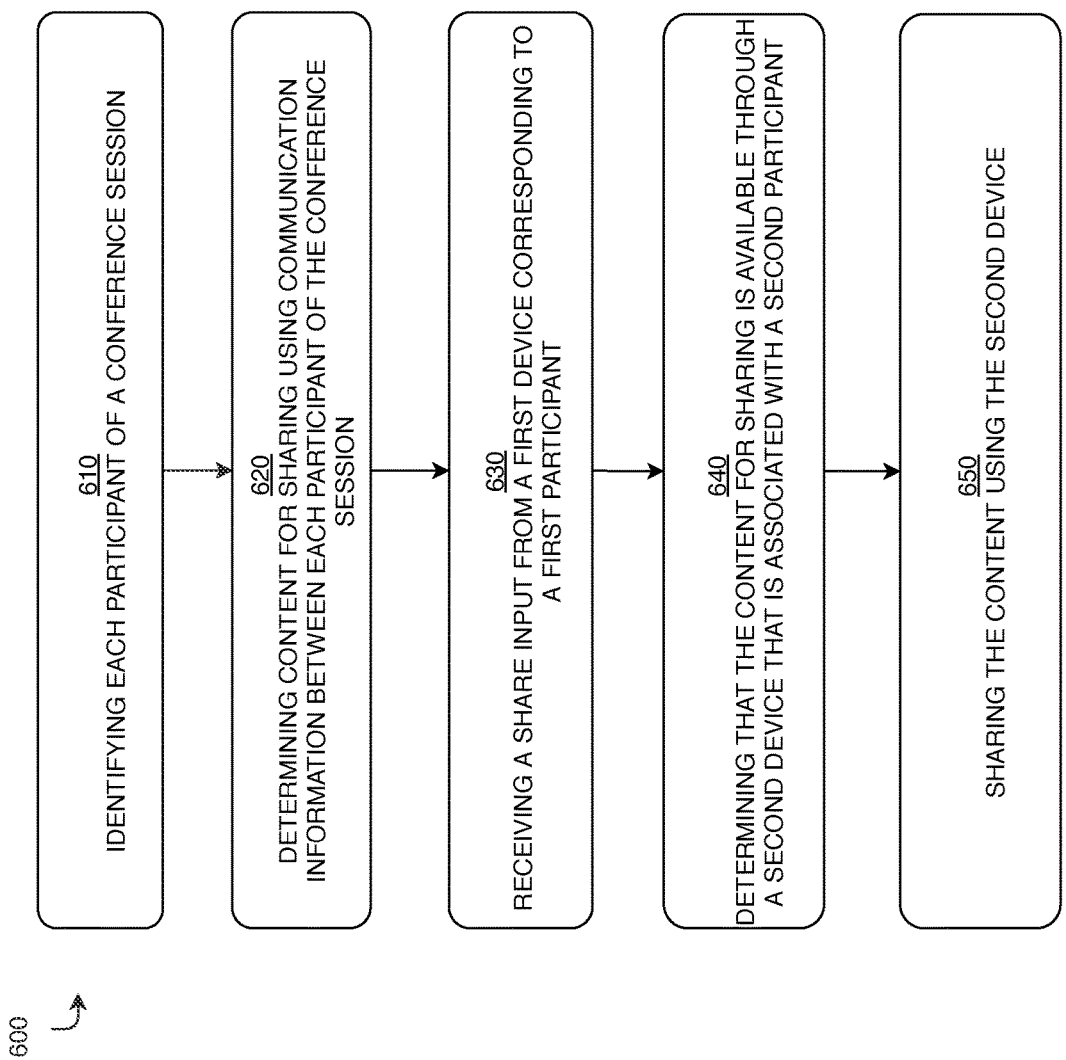
FIG. 6 is a flowchart that shows a method of intelligently sharing conference content, in an example embodiment.

FIG. 6 is a flowchart that shows a method of intelligently sharing conference content, in an example embodiment.

At step 610, all participants that will be participating in a conference session are identified. Identification can be done based on an invitation for the conference session, based on a schedule of all presenters, etc. The identification includes retrieving all available information including, but not limited to a name, an email address, phone number, title in an organization, nickname in different online communication resources, usernames, social media contacts, LinkedIn page, etc. For example, the conference management server 150 can determine all the information above by requesting user devices 120A-120C for identification information, which includes all the above. The user devices 120A-120C can share with the conference management server 150 the identification information based, for example, on saved logins to different services, communication resources, etc.

At step 620, a content for sharing is determined using communication information specifically between the participants of a conference. For example, the conference management server 150, based on past, recent, or ongoing communication as was described in relation to FIG. 2 between participants of the conference, determines a likely content for sharing. The conference management server 150 can access the devices of the participants of the conference, for example user devices 120A-120C to parse all types of participant communications to determine the likely content for sharing.

In some embodiments, the conference management server 150 can determine several likely contents for sharing that can be ranked based on a likelihood score. The determination can also be done using machine learning techniques described in relation to FIG. 3.

At step 630, a share input from a first device is received. For example, a presenter (e.g. the user 130C) triggers a conference session sharing by clicking (or otherwise choosing) share control function 410 on the display 404 on the user device 120C. In some embodiments, this is done through a browser. The conference management server 150, after receiving a signal from the user device 120C to start sharing the content, determines where the likely content for sharing is stored across all participants devices.

At step 640, the content for sharing is determined to be available through the second device associated with a second participant. For example, the conference management server 150 determines that the content for sharing is available through a user device 120A associated with a user 130A, who is not the presenter.

At step 650, the content is shared during the conference session using the second device. For example, the conference management server 150 retrieves the content from the second device where it is stored (e.g. user device 120A) and where the conference management 150 has access, by default or after receiving approval for such access from user 120A or user 120C, and shares the content with other participants using the user device 120A.

Figure 7:
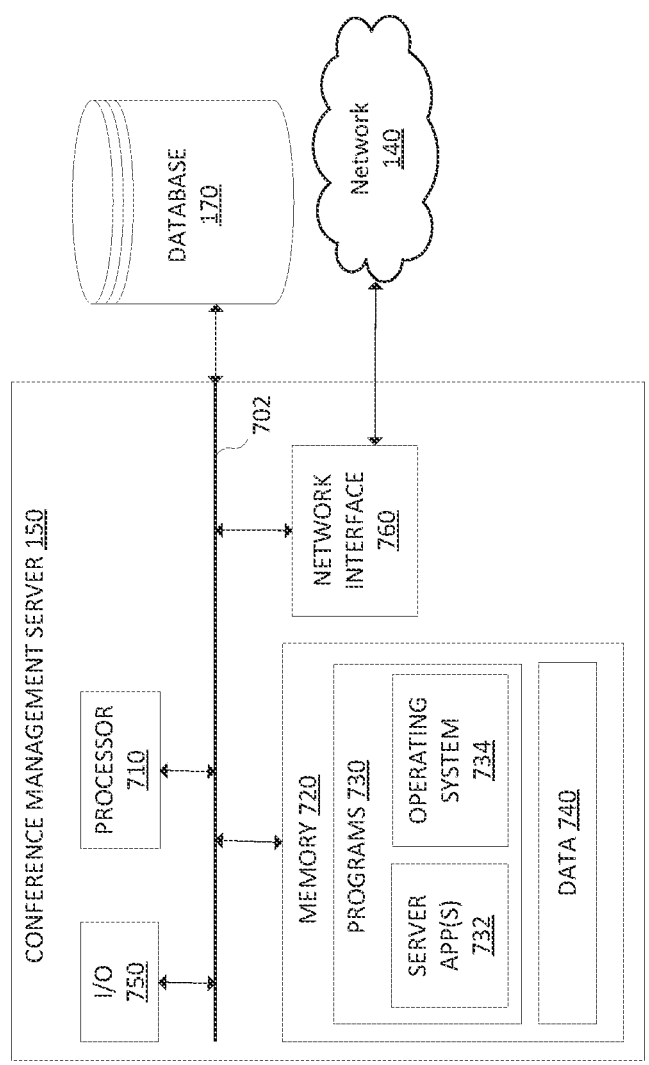
FIG. 7 is a diagram of an example conference management server, in accordance with some embodiments of the present disclosure.

FIG. 7 shows a diagram of an example conference management server 150, consistent with the disclosed embodiments. The conference management server 150 includes a bus 702 (or other communication mechanism) which interconnects subsystems or components for transferring information within the conference management server 150. As shown, the conference management server 150 includes one or more processors 710, input/output ("I/O") devices 750, network interface 760 (e.g., a modem, Ethernet card, or any other interface configured to exchange data with the network 140), and one or more memories 720 storing programs 730 including, for example, server app(s) 732, operating system 734, and data 740, and can communicate with an external database 170 (which, for some embodiments, may be included within the conference management server 150). The conference management server 150 may be a single server or may be configured as a distributed computer system including multiple servers, server farms, clouds, or computers that interoperate to perform one or more of the processes and functionalities associated with the disclosed embodiments.

The processor 710 may be one or more processing devices configured to perform functions of the disclosed methods, such as a microprocessor manufactured by Intel™ or manufactured by AMD™. The processor 710 may comprise a single core or multiple core processors executing parallel processes simultaneously. For example, the processor 710 may be a single core processor configured with virtual processing technologies. In certain embodiments, the processor 710 may use logical processors to simultaneously execute and control multiple processes. The processor 710 may implement virtual machine technologies, or other technologies to provide the ability to execute, control, run, manipulate, store, etc. multiple software processes, applications, programs, etc. In some embodiments, the processor 710 may include a multiple-core processor arrangement (e.g., dual, quad core, etc.) configured to provide parallel processing functionalities to allow the conference management server 150 to execute multiple processes simultaneously. It is appreciated that other types of processor arrangements could be implemented that provide for the capabilities disclosed herein.

The memory 720 may be a volatile or non-volatile, magnetic, semiconductor, tape, optical, removable, non-removable, or other type of storage device or tangible or non-transitory computer-readable medium that stores one or more program(s) 730 such as server apps 732 and operating system 734, and data 740. Common forms of non-transitory media include, for example, a flash drive a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

The conference management server 150 may include one or more storage devices configured to store information used by processor 710 (or other components) to perform certain functions related to the disclosed embodiments. For example, the conference management server 150 may include memory 720 that includes instructions to enable the processor 710 to execute one or more applications, such as server apps 732, operating system 734, and any other type of application or software known to be available on computer systems. Alternatively or additionally, the instructions, application programs, etc. may be stored in an external database 170 (which can also be internal to the conference management server 150) or external storage communicatively coupled with the conference management server 150 (not shown), such as one or more database or memory accessible over the network 140.

The database 170 or other external storage may be a volatile or non-volatile, magnetic, semiconductor, tape, optical, removable, non-removable, or other type of storage device or tangible or non-transitory computer-readable medium. The memory 720 and database 170 may include one or more memory devices that store data and instructions used to perform one or more features of the disclosed embodiments. The memory 720 and database 170 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, the conference management server 150 may be communicatively connected to one or more remote memory devices (e.g., remote databases (not shown)) through network 140 or a different network. The remote memory devices can be configured to store information that the conference management server 150 can access and/or manage. By way of example, the remote memory devices could be document management systems, Microsoft SQL database, SharePoint databases, Oracle™ databases, Sybase™ databases, or other relational databases. Systems and methods consistent with disclosed embodiments, however, are not limited to separate databases or even to the use of a database.

The programs 730 include one or more software modules configured to cause processor 710 to perform one or more functions consistent with the disclosed embodiments. Moreover, the processor 710 may execute one or more programs located remotely from one or more components of the conference management system 100. For example, the conference management server 150 may access one or more remote programs that, when executed, perform functions related to disclosed embodiments.

In the presently described embodiment, server app(s) 732 causes the processor 710 to perform one or more functions of the disclosed methods. For example, the server app(s) 732 cause the processor 710 to receive conference information, such as conference participants, communications of the conference participants; determine, based on the received communications of the conference participants a likely content for sharing; determine where the likely content for sharing is stored; check access to the likely conference for sharing, receive a trigger action that causes sharing the likely content for sharing with the participants of the conference session and determine a list of a participant with whom the likely content for sharing should be shared. In some embodiments, other components of the conference management system 100 may be configured to perform one or more functions of the disclosed methods. For example, user devices 120A-120E may be configured to determine, based on communications of the conference participants, the likely content for sharing, the likely content for sharing place of storage and the list of participants with whom the likely content for sharing should be shared.

In some embodiments, the program(s) 730 may include the operating system 734 performing operating system functions when executed by one or more processors such as the processor 710. By way of example, the operating system 734 may include Microsoft Windows™, Unix™, Linux™, Apple™ operating systems, Personal Digital Assistant (PDA) type operating systems, such as Apple iOS, Google Android, Blackberry OS, or other types of operating systems. Accordingly, disclosed embodiments may operate and function with computer systems running any type of operating system 734. The conference management server 150 may also include software that, when executed by a processor, provides communications with the network 140 through the network interface 760 and/or a direct connection to one or more user devices 120A-120E.

In some embodiments, the data 740 may include, conference information received from user devices 120, profiles of users 130 such as contact information and communications of users 130. Data 740 may further include data used for determining a likely content for sharing. For example, data 740 may include the text data, the audio data and the other data as described in FIG. 3.

The conference management server 150 may also include one or more I/O devices 750 having one or more interfaces for receiving signals or input from devices and providing signals or output to one or more devices that allow data to be received and/or transmitted by the conference management server 150. For example, the conference management server 150 may include interface components for interfacing with one or more input devices, such as one or more keyboards, mouse devices, and the like, that enable the conference management server 150 to receive input from an operator or administrator (not shown).

What is claimed is:

1. A computer-implemented method for sharing conference content, the method comprising:
    receiving a share input from a first device corresponding to a participant of a conference session, wherein the share input is in response to the participant manipulating the first device and wherein the share input is an indication for a content to be shared without identifying the content to be shared, wherein receiving the share input is a signal indicating a selection of a share control;
    identifying the content to be shared based on one or more prior communications between at least one participant of the conference session and another user, and wherein the identifying is further based on receiving keywords corresponding to the content from the conference session, wherein the identifying the content occurs without a user selection of the content, wherein the one or more prior communications is related to the content and occurs prior to receiving the share input;
    determining that the content is available to share from a second device; and
    sharing the content via the second device with participants of the conference session.

2. The method of claim 1, further comprising:
determining that the content is unavailable to share from the first device.

3. The method of claim 1, further comprising:
enabling the first device to control the content, which is shared via the second device.

4. The method of claim 1, wherein the content comprises audio data or text data.

5. The method of claim 1, wherein sharing the content comprises causing to display the content through a browser.

6. A non-transitory, computer-readable medium storing a set of instructions that, when executed by a processor, cause:
receiving a share input from a first device corresponding to a participant of a conference session, wherein the share input is in response to the participant manipulating the first device and wherein the share input is an indication for a content to be shared without identifying the content to be shared, wherein receiving the share input is a signal indicating a selection of a share control;
identifying the content to be shared based on one or more prior communications between at least one participant of the conference session and another user, and wherein the identifying is further based on receiving keywords corresponding to the content from the conference session, wherein the identifying the content occurs without a user selection of the content, wherein the one or more prior communications is related to the content and occurs prior to receiving the share input;
determining that the content is available to share from a second device; and
sharing the content via the second device with participants of the conference session.

7. The non-transitory, computer-readable medium of claim 6, storing a second set of instructions that, when executed by the processor, further cause:
determining that the content is unavailable to share from the first device.

8. The non-transitory, computer-readable medium of claim 6, storing a second set of instructions that, when executed by the processor, further cause:
enabling the first device to control the content, which is shared via the second device.

9. The non-transitory, computer-readable medium of claim 6, wherein the content comprises audio data or text data.

10. The non-transitory, computer-readable medium of claim 6, wherein sharing the content comprises causing to display the content through a browser.

11. A system, comprising:
a processor;
a memory operatively connected to the processor and storing instructions that, when executed by the processor, cause:
receiving a share input from a first device corresponding to a participant of a conference session, wherein the share input is in response to the participant manipulating the first device and wherein the share input is an indication for a content to be shared without identifying the content to be shared, wherein receiving the share input is a signal indicating a selection of a share control;
identifying the content to be shared based on one or more prior communications between at least one participant of the conference session and another user, and wherein the identifying is further based on receiving keywords corresponding to the content from the conference session, wherein the identifying the content occurs without a user selection of the content, wherein the one or more prior communications is related to the content and occurs prior to receiving the share input;
determining that the content is available to share from a second device; and
sharing the content via the second device with participants of the conference session.

12. The system of claim 11, wherein the memory stores further instructions that, when executed by the processor, cause:
determining that the content is unavailable to share from the first device.

13. The system of claim 12, wherein sharing the content comprises causing to display the content through a browser.

14. The system of claim 11, wherein the content comprises audio data or text data.

15. The system of claim 11, wherein the content is shared between a limited list of conference participants.

* * * * *